United States Patent [19]
Holland

[11] Patent Number: 5,387,321
[45] Date of Patent: Feb. 7, 1995

[54] APPARATUS FOR WASTE PYROLYSIS

[76] Inventor: Kenneth M. Holland, Ashwood, Wynwoods, Campbell Close, Rise Park, Romford, Essex, United Kingdom

[21] Appl. No.: 826,020

[22] Filed: Jan. 27, 1992

Related U.S. Application Data

[63] Continuation-in-part of Ser. No. 558,706, Jul. 27, 1990, Pat. No. 5,084,140, which is a continuation-in-part of Ser. No. 335,210, May 15, 1989, abandoned.

[30] Foreign Application Priority Data

May 13, 1987 [GB] United Kingdom ............... 8711257
Nov. 11, 1987 [GB] United Kingdom ............... 8726396

[51] Int. Cl.$^6$ ............................................. C10B 1/04
[52] U.S. Cl. ................................. 202/99; 202/105; 202/120; 202/124
[58] Field of Search ............... 202/99, 105, 120, 124; 201/19, 21, 25, 32, 40; 48/65, 111; 204/193

[56] References Cited

U.S. PATENT DOCUMENTS 4,118,282 10/1978 Wallace ........................... 202/105
4,376,034 3/1983 Wall ................................. 201/19

*Primary Examiner*—Joye L. Woodard
*Attorney, Agent, or Firm*—Rodman & Rodman

[57] ABSTRACT

Apparatus and method for the pyrolysis of waste material which is not itself susceptible to heating by microwave radiation. The method comprises:

(a) contacting the waste material, under an atmosphere wherein flame generation is substantially prevented, with a bed of pulverulent carbonaceous material (such as pulverised scrap tires) which is susceptible to heating by microwave irradiation; and (b) heating the pulverulent material by means of microwave irradiation so as to transfer thermal energy from the pulverulent material to the waste material and cause substantial pyrolysis of the waste material.

The apparatus comprises:

(a) a container 9 which is inert to microwave radiation and capable of retaining the bed of pulverulent material;
(b) a reaction chamber 8;
(c) a conduit 19 for feeding the waste material to an upper part of the bed of pulverulent material;
(d) a microwave generator 10;
(e) air locks 12 and 18 for controlling the atmosphere in chamber 8 such that flame generation is prevented in chamber 8; and
(f) outlet 20 for removal of gases, evolved on pyrolysis of the waste material, from chamber 8.

9 Claims, 3 Drawing Sheets

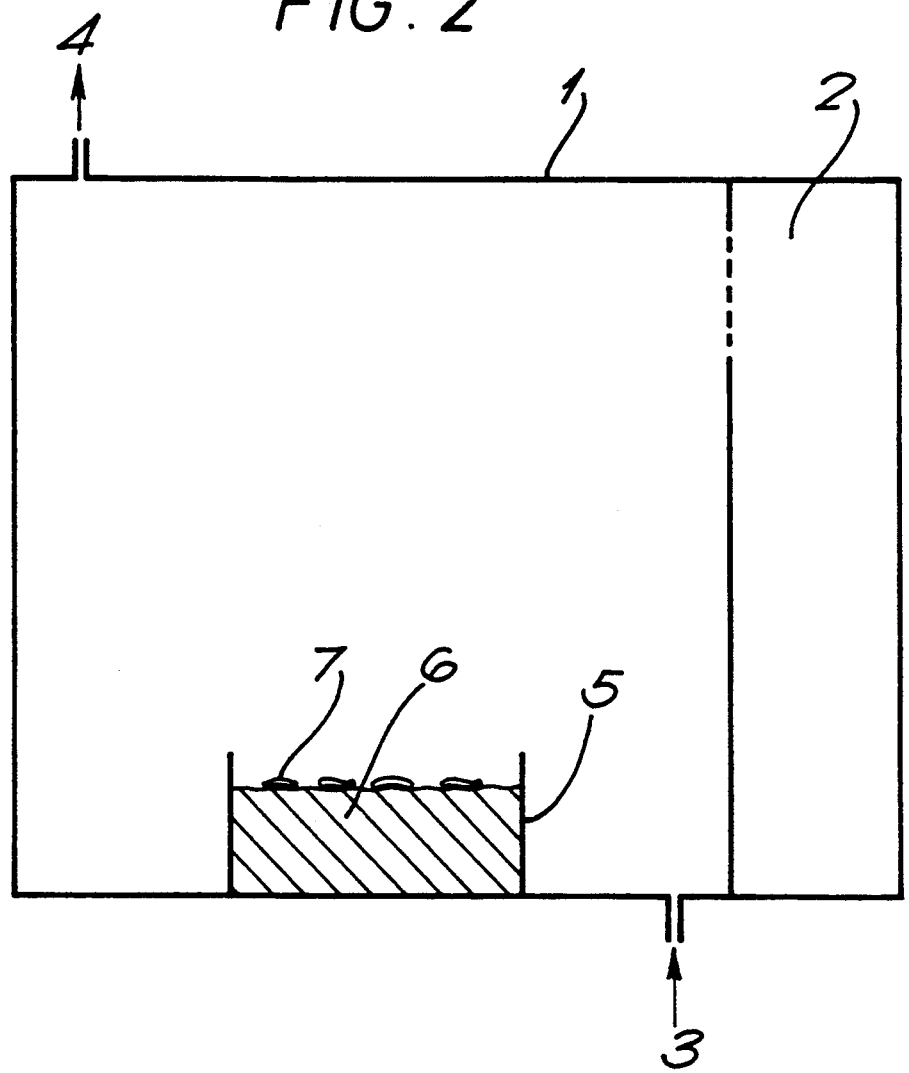

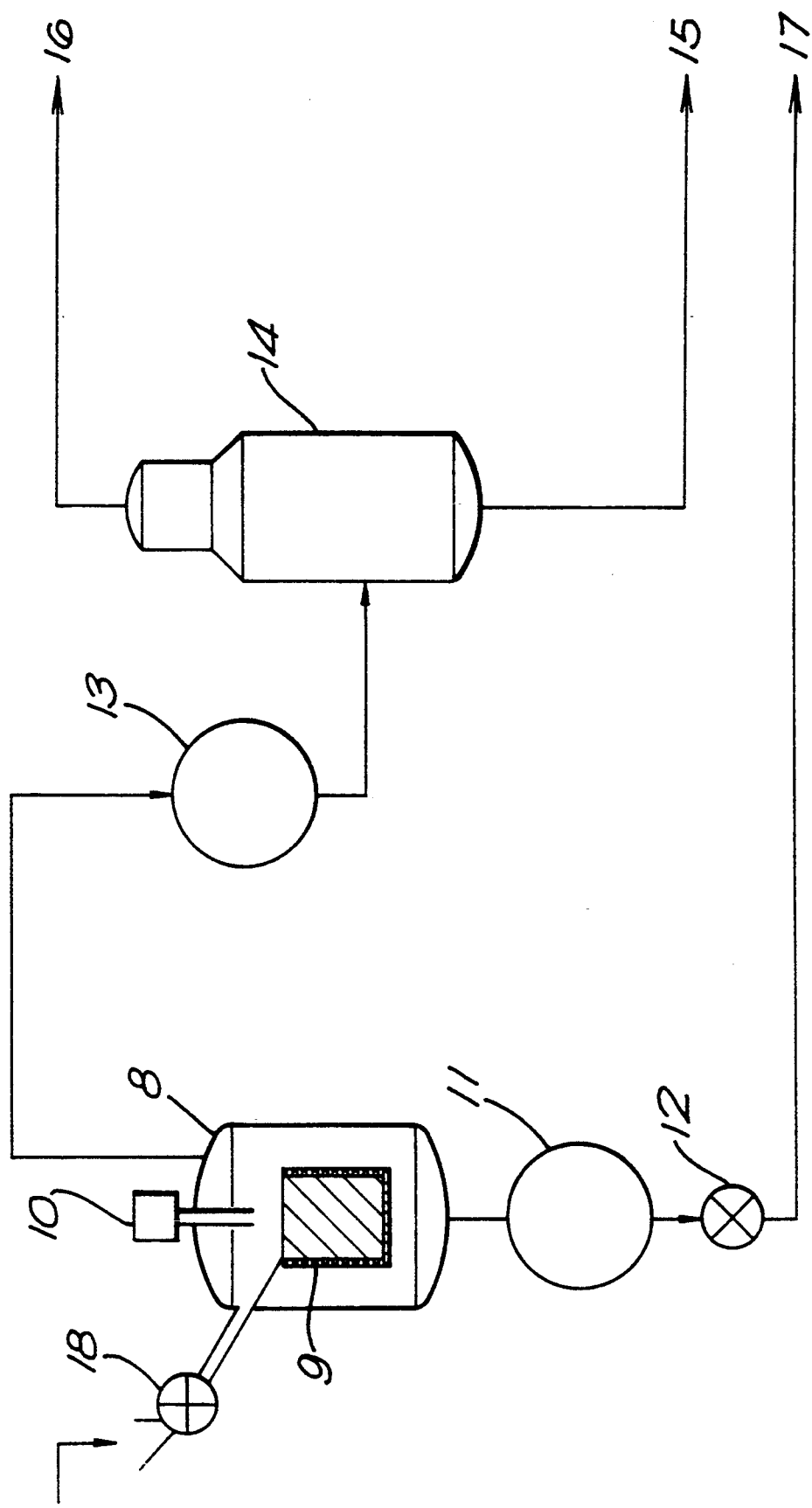

APPARATUS FOR WASTE PYROLYSIS

CROSS-REFERENCE TO RELATED APPLICATIONS

This is a continuation-in-part of application Ser. No. 558,706 filed Jul. 27, 1990, and now U.S. Pat. No. 5,084,140, which is a continuation-in-part of application Ser. No. 335,210 filed May 15, 1989, and now abandoned.

BACKGROUND OF THE INVENTION

The present invention is concerned with an apparatus and method for carrying out the pyrolysis of waste material.

DESCRIPTION OF THE PRIOR ART

The destruction of waste material produced in the medical field is a substantial problem, because of the increasing amount of "one-use" disposable materials (such as swabs, syringes, disposable gloves or the like) being used in this field. The problem further extends to the destruction of waste material produced in other fields, such as, for example, waste plastics material resulting from discarded automobile bodies and packaging. Such waste material is generally disposed of either by incineration or by landfill; the former method is objectionable on environmental grounds because of the nature of some of the combustion gases produced, while the latter method is inefficient because of the large bulk of plastics material. Similarly, the destruction of materials such as polychlorinated biphenyls (PCB's) and non-biodegradable matter screened from sewage is also a substantial problem, as is the destruction of CFC's and biochemical waste.

SUMMARY OF THE INVENTION

The present invention comprises a method for the pyrolysis of waste material which is not itself susceptible to heating by microwave radiation, which method comprises the steps of:

(a) mixing said waste material with pulverulent material which consists of or contains carbon in elemental form, or with a material which is capable of being pyrolysed to elemental carbon by microwave irradiation, wherein said pulverulent material is susceptible to heating by microwave irradiation, under an atmosphere wherein flame generation is substantially prevented;

(b) retaining said mixture in retaining means which is inert to microwave radiation; and (c) subjecting said mixture to microwave irradiation such that said pulverulent material is heated and thermal energy is transferred from said pulverulent material to said waste material, the dose and intensity of said radiation being controlled so as to cause substantial pyrolysis of said waste material.

A highly preferred pulverulent material for use in the method according to the invention is scrap carbon-filled vulcanized rubber.

The microwave radiation is preferably employed at such a power and for sufficient time that the pulverulent material is heated to at least about 400° C. When the method according to the invention is carried out in a substantially oxygen-free atmosphere, there would in general only be a danger of production of dioxin or other noxious products with certain feedstocks. In such cases, and also in cases where a small amount of oxygen is present (but without sufficient amount thereof to cause flame generation), it is preferred to ensure that the pulverulent material (and therefore the plastics or other waste) attains a temperature of at least 800° C., which is sufficiently high that the risk of evolution of dioxins or similar noxious products by the pyrolysed material is minimized or eliminated.

If the waste material being pyrolyzed in the method according to the invention is relatively easily degraded (e.g. polyethylene or nylon), then temperatures from about 400° to 800° C. may be satisfactorily employed. When more thermally resistant plastics and halogenated plastics (such as PTFE or PVC) are employed, the temperature of the carbonaceous material may be at least 800° C.

In one embodiment of the invention, the method may be carried out by feeding the waste material to an upper part of the bed of pulverulent material such that the waste material is permitted to sink through the bed, and is pyrolyzed within the bed. The present invention further comprises apparatus suitable for carrying out the microwave pyrolysis of waste material in the latter embodiment, which apparatus comprises:

(a) retaining means substantially inert to microwave radiation which is capable of retaining a bed of pulverulent material, and arranged to permit the pulverulent material to overflow from the retaining means;

(b) a reaction chamber arranged to surround the retaining means;

(c) means for feeding waste material to an upper part of the bed of pulverulent material retained in the retaining means such that, in use, the waste material will sink through the bed;

(d) a microwave radiation source, the radiation source and retaining means being relatively positioned such that microwave radiation emitted by the source can cause heating of the pulverulent material and substantial pyrolysis of the waste material as the latter sinks through the bed of pulverulent material;

(e) means for controlling the atmosphere in said chamber such that flame generation is substantially prevented in the chamber; and (f) means for removal of gases evolved on pyrolysis of the waste material from the chamber.

Typically the retaining means comprises an open-topped receptacle which is generally of a material such as stainless steel or a ceramic material which is preferably resistant to temperatures of at least about 800° C., or typically of the order of about 1000° C.

In apparatus as described, the waste material may be fed to an upper part of the bed of pulverulent material in order to maximise contact of the waste material with the pulverulent material as the former sinks through the bed of pulverulent material. The greater the extent of contact between the waste material and the pulverulent material, the more efficient is the energy transfer from the pulverulent material to the waste material and hence enhanced pyrolysis of the waste material can be achieved. The feeding means preferably comprises a conduit arranged to pass through a first opening in an upper section of the chamber wall and to further extend through the interior of the chamber such that a leading end portion of the conduit is located above the open end of the receptacle. Typically part of the conduit rests on an upper edge portion of the receptacle wall.

The feeding means may be arranged to be inclined so that the waste material can easily slide along the feeding means into the retaining means. Typically the inclined feeding means is orientated in such a way that the waste material can be fed in substantially continuous manner to the retaining means; in alternative embodiments the waste material may be supplied semi-continuously or intermittenly (in a batch process, for example). The use of such an inclined feeding means minimises the need for mechanical feeding means to transfer the waste material to the retaining means.

In the above-mentioned embodiment, the waste material may be supplied in such a manner that the pulverulent material is allowed to overflow from the receptacle as denser waste material sinks towards the bottom of the recptacle, displacing less dense carbonaceous material upwards as it does so. (The bulk specific gravity of finely divided elemental carbon is, for example, about 0.5 whereas waste material such as plastics normally has a bulk specific gravity of about 0.8 to 1.0). The pulverulent material overflowing from the static bed is preferably at least partly recycled thereto. The rate of feed depends largely on the power of the microwave discharge used during pyrolysis. The microwave discharge typically has a frequency of about 2.4 gigahertz or about 0.91 gigahertz.

Typically the microwave radiation source is arranged remote from the chamber, a passage being arranged to extend from the microwave radiation source through a second opening provided in the chamber wall to a position adjacent the open end of the receptacle. The passage defines a pathway for the microwave radiation from its source or generating means to the retaining means.

The chamber is preferably provided with first and second outlets. The first outlet is provided through a lower section of the chamber wall and is typically located directly below the retaining means so as to be suitably positioned to receive any pulverulent material overflowing from the retaining means. Typically the first outlet leads to first cooling means for the pulverulent material, such that a substantially solid carbon product can be recovered therefrom. The means for removal of any gaseous products evolved during the pyrolysis generally comprises the second outlet which itself leads to gas cooling means before entering a liquid/gas separator which separates the evolved gas into oil products and waste gases. The second outlet is preferably arranged in an upper section of the chamber so as to be suitably located to collect any hot gases which rise from the waste material located in the retaining means during pyrolysis. The means for controlling the atmosphere such that flame generation is substantially prevented generally comprise first and second air locks, the first air lock being located at a position along the path of the feeding means and the second air lock being positioned downstream of the pulverulent material cooling means.

BRIEF DESCRIPTION OF THE DRAWINGS

FIG. 2 is a schematic illustration of the operation of an exemplary embodiment of a method according to the invention; and FIG. 3 is a schematic illustration of exemplary apparatus according to the invention.

Referring to FIG. 1, scrap vulcanised tire-compound is pulverized at A, mixed with scrap plastics or other waste at B, and then passed to microwave irradiation zone C which is supplied with an inlet for inert gas and an outlet therefor.

Figure 1:
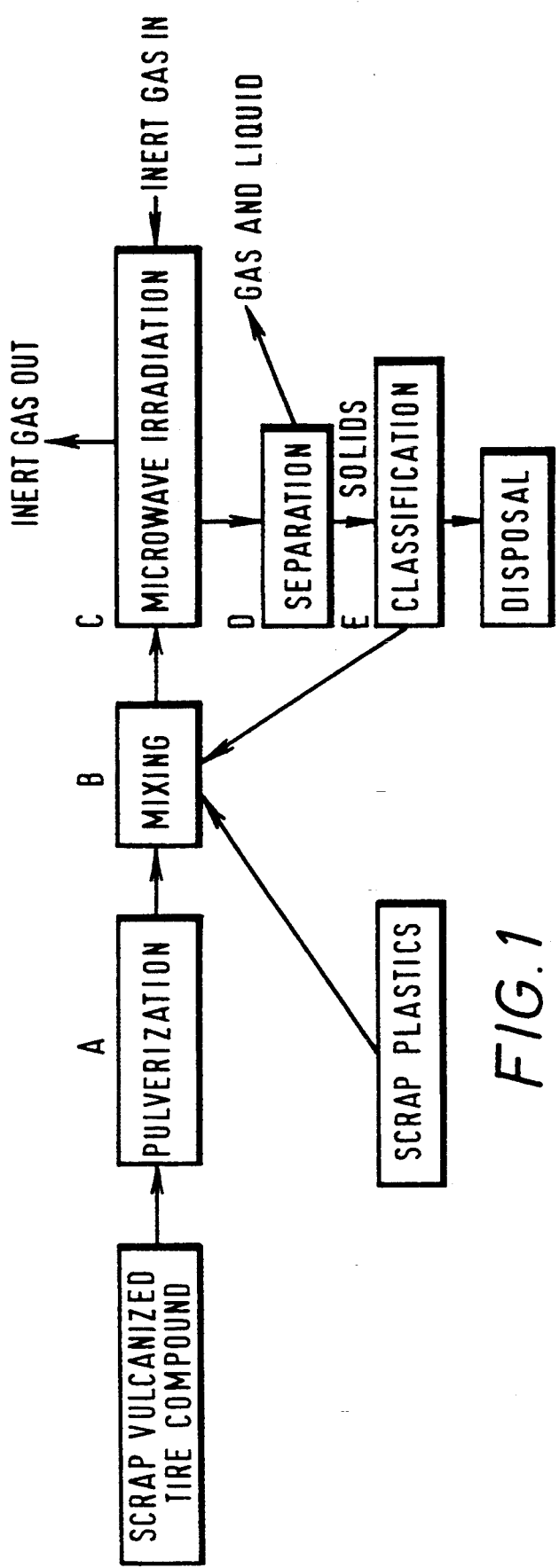
FIG. 1 is a block diagram illustrating a typical sequence of operations in an exemplary embodiment of a method according to the invention.

Material from the microwave irradiation zone is separated at D into gas and liquid and solids; solids are passed to a classification zone E, and thence to disposal.

Referring to FIG. 2, there is schematically shown a microwave oven 1 incorporating a microwave generator 2, an inlet 3 for inert gas (such as nitrogen) and an outlet 4 for inert gas and evolved gases.

Disposed within the oven is a bowl or other suitable receptacle 5 (of stainless steel, ceramic or the like) partially filled with pulverulent carbonaceous medium 6; plastics waste 7 is partially immersed in the latter.

In an example, a one kilowatt industrial microwave oven was employed, and the bowl disposed in the oven charged with approximately one kilogram of pulverulent carbonaceous medium and a similar quantity of plastics or other macromolecular waste. The oven was then supplied with an oxygen-free atmosphere and then actuated for irradiation for a period of three minutes, during which period the carbonaceous material became red hot (attaining about 800° C.).

Gases evolved were removed by an extractor fan and passed to a cleaning-scrubbing apparatus (not shown); the powder remaining in the bowl was then ready for charging with fresh quantities of plastics waste.

Referring to FIG. 3, waste material and pulverulent carbonaceous material are supplied together to a refractory-lined stainless steel pyrolysis chamber 9, in a reactor 8, via an air lock 18. The material in the chamber is exposed to microwave irradiation from a microwave generator 10.

The pulverulent material (including waste material which has been pyrolyzed to elemental carbon) overflows from the pyrolysis chamber 9 and passes through a carbon cooler 11 and air lock 12 before being recovered from the process as a solid carbon product 17. Hydrocarbon gases evolved during pyrolysis are passed out of the reactor 8, and through a hydrocarbon cooler 13 before entering a liquid gas separator 14 which separates the waste gas into oil products 15 and (acidic) waste gases 16. The waste gases may then be "scrubbed" before being released to the atmosphere.

The present invention has been described in detail with reference to embodiments in which the material which is not susceptible to microwave radiation is of higher apparent density than the bed of pulverulent material, is fed to an upper part of the bed, and allowed to sink therethrough. In an alternative (for example, when the waste material is gaseous or liquid), the waste material may be fed from a lower part of the bed and allowed to rise therethrough while being pyrolyzed.

A further possibility is that the waste material may be pre-mixed with the pulverulent material; such pre-mixed material may be formed into shaped agglomerates (such as briquettes) prior to subjecting the mix to microwave radiation.

When a fluidised bed is used (for waste material fed to the top part of the bed, the bottom part of the bed, or pre-mixed with pulverulent material), it is preferred that fluidization be effected by gas comprising hot gaseous by-products produced by pyrolysis of the waste material.

I claim:

1. Apparatus suitable for carrying out the microwave pyrolysis of waste material which is not itself susceptible to heating by microwave radiation, which apparatus comprises:

a) retaining means substantially inert to microwave radiation which is capable of retaining a bed of pulverulent material and permitting the pulverulent material to overflow from the retaining means;

b) a reaction chamber arranged to surround the retaining means such that pulverulent material overflows the retaining means within the confines of the reaction chamber and gases evolved on pyrolysis of waste material in the retaining means flow into the reaction chamber;

c) means for feeding waste material through the reaction chamber to an upper part of the bed of pulverulent material retained in the retaining means such that, in use, the waste material will sink through the bed of pulverulent material;

d) a microwave radiation generating means communicable with the retaining means through the reaction chamber, the radiation generating means and the retaining means being relatively positioned such that microwave radiation emitted by the generating means can cause heating of the pulverulent material and substantial pyrolysis of the waste material as the latter sinks through the bed of pulverulent material;

e) means for controlling the atmosphere in said reaction chamber such that flame generation is substantially prevented in the reaction chamber; and f) means for removal of gases from the reaction chamber that are evolved on pyrolysis of the waste material in the retaining means.

2. Apparatus according to claim 1, wherein said retaining means comprises an opentopped receptacle of a material which is resistant to temperatures of at least 800° C.

3. Apparatus according to claim 1, wherein said retaining means comprises an open-ended receptacle open to said reaction chamber for permitting said overflow and said reaction chamber includes a chamber wall, said feeding means comprising a conduit arranged to pass through a first opening in an upper section of the chamber wall and to further extend through the interior of the chamber such that a leading end portion of the conduit is located above the open end of the retaining means.

4. Apparatus according to claim 3, wherein said open-ended receptacle includes a receptacle wall having an upper edge portion at said open end and wherein part of the conduit rests on the upper edge portion of the receptacle wall.

5. Apparatus according to claim 1, wherein the feeding means is arranged to be inclined so that the waste material can slide along the feeding means into the retaining means.

6. Apparatus according to claim 1, wherein said retaining means includes an open-ended receptacle open to said reaction chamber for permitting said overflow and said reaction chamber includes a chamber wall, and the microwave radiation generating means is arranged remote from the chamber, with a passage arranged to extend from the microwave radiation generating means through an opening provided in the chamber wall to a position adjacent the open end of the receptacle.

7. Apparatus according to claim 1, wherein the reaction chamber includes a chamber wall that is provided with a first outlet means provided through a lower section of the chamber wall and located below the retaining means so as to receive pulverulent material overflowing from the retaining means; and wherein said means for removal of gases comprises a second outlet means which is provided at an upper section of the chamber wall for collection of any hot gases rising from the waste material during pyrolysis.

8. Apparatus according to claim 7 further including a first cooling means for the pulverulent material communicable with said reaction chamber through said first outlet means and a gas cooling means communicable with said second outlet means, said apparatus further including a liquid/gas separator communicable with said gas cooling means.

9. Apparatus according to claim 7 wherein said feeding means defines a pathway, and said apparatus further including pulverulent material cooling means communicating with said first outlet means and wherein said means for controlling the atmosphere in said reaction chamber comprising first and second air locks, the first air lock being located along the pathway of the feeding means and the second air lock being positioned downstream of the pulverulent material cooling means.

* * * * *